United States Patent
Battig

(10) Patent No.: US 7,240,892 B2
(45) Date of Patent: Jul. 10, 2007

(54) SECURING DEVICE FOR A TURBOCHARGER

(75) Inventor: Josef Battig, Egliswil (CH)

(73) Assignee: ABB Turbo Systems AG, Baden (CH)

( * ) Notice: Subject to any disclaimer, the term of this patent is extended or adjusted under 35 U.S.C. 154(b) by 106 days.

(21) Appl. No.: 10/500,887

(22) PCT Filed: Jan. 15, 2003

(86) PCT No.: PCT/CH03/00018

§ 371 (c)(1),
(2), (4) Date: Jul. 7, 2004

(87) PCT Pub. No.: WO03/064819

PCT Pub. Date: Aug. 7, 2003

(65) Prior Publication Data

US 2005/0017151 A1    Jan. 27, 2005

(30) Foreign Application Priority Data

Jan. 29, 2002   (EP)   ................. 02405052

(51) Int. Cl.
F16M 1/00 (2006.01)
F16M 3/00 (2006.01)
F16M 5/00 (2006.01)
F16M 7/00 (2006.01)

(52) U.S. Cl. ............ 248/677; 248/637; 248/676; 415/213.1

(58) Field of Classification Search ............ 248/637, 248/676, 207, 649, 677, 678; 415/213.1; 417/360

See application file for complete search history.

(56) References Cited

U.S. PATENT DOCUMENTS 2,469,936 A * 5/1949 Tabbert ............. 418/39

(Continued)

FOREIGN PATENT DOCUMENTS

DE     3641478 A    6/1988

(Continued)

OTHER PUBLICATIONS

"The Range of ABB Turbochargers", ABB Turbo Systems Ltd., No. CH-Z 2008 97 E (cited in specification).

(Continued)

Primary Examiner—Amy J. Sterling
(74) Attorney, Agent, or Firm—Buchanan Ingersoll & Rooney PC

(57) ABSTRACT

The invention proposes a securing device (26) for securing a turbocharger (12) comprising a turbocharger casing (14) to a base (28). The securing device (26) has a first foot (30) which can be fixed in the base (28) and a second foot (32) which can be fixed in the base (28), it being possible for the two feet (30, 32) to be connected to the turbocharger casing (14) at an axial distance from one another. The second foot (32) has a casing connection region (34), which can be connected to the turbocharger casing (14), and a base connection region (36), which can be connected to the base (28). The casing connection region (34) is designed in the form of a partial circle arc or circle arc. An axial strut arrangement (38) connects the casing connection region (34) and the base connection region (36) and includes an angle α in the range from 0° to 60° with the base (28).

15 Claims, 4 Drawing Sheets

U.S. PATENT DOCUMENTS 3,628,884 A * 12/1971 Mierley, Sr. ............. 415/213.1
3,891,345 A    6/1975 Doolin
6,099,250 A * 8/2000 Ko ........................... 415/213.1
6,244,819 B1 * 6/2001 Voorhees ................. 415/213.1

FOREIGN PATENT DOCUMENTS

DE    4432073 A    3/1996
DE   19925684 A   12/2000
EP   0 785 389 A1  7/1997

OTHER PUBLICATIONS

"Mitsubishi MET-SD, MET-SE Turbochargers", Mitsubishi Heavy Industries, Ltd., H420-42TU11 E1-A-0, (1.0) 98-3 R, p. 6 (cited in specification).

* cited by examiner

SECURING DEVICE FOR A TURBOCHARGER

DESCRIPTION

1. Technical Field

The invention relates to a securing device for turbochargers in accordance with the features of the preamble of patent claim 1.

2. Prior Art

Securing devices for turbochargers have to perform various roles. There are securing devices with just one foot and securing devices with two feet. An advantage of securing devices with two feet is that the dismantling and installation required for maintenance work is generally easier and quicker than in the case of securing devices with just one foot.

In the case of securing devices with two feet, the feet are arranged on the turbocharger at an axial distance from one another and can be secured to the base. They are used to support and fix the turbocharger with respect to the base, to absorb vibrations in the turbocharger, so that they are not completely transmitted to the base, and to compensate for thermally induced dilation of the turbocharger casing. To absorb the vibrations, the feet should have a high rigidity, whereas to compensate for housing dilation it is necessary for at least one foot to have a certain flexibility at least in the axial direction. Accordingly, the literature describes securing devices with feet which are of approximately equal rigidity or flexibility, as disclosed, for example, in the brochure "The Range of ABB Turbochargers" from ABB Turbo Systems Ltd., No. CH-Z 2008 97 E, Figure 203 044 VTR: The Classic and Figure 226 874 VTC: The Compact, and also securing devices in which one of the two feet, as the main foot, is very rigid, while the other of the two feet, as an auxiliary foot, is designed to be highly flexible in the axial direction, as shown, for example, in the brochure produced by Mitsubishi Heavy Industries, Ltd. H420-42TU11 E1-A-0, (1,0)98-3 R, p. 6 and in DE-A1-199 25 684.

If the turbocharger is arranged on an engine, the securing device has to perform a further role. It has to prevent the turbocharger from being excited to natural frequency oscillations by the engine vibrations. In the case of the securing devices described above, it has been found that the natural frequency of the turbocharger is, unluckily, close to the engine ignition frequencies, and the securing device is often unable to effectively prevent excitation to natural frequency oscillations. To prevent such excitation, the feet of the known securing device would have to be hugely reinforced, which would lead to higher materials costs and a greater weight.

SUMMARY OF THE INVENTION

Therefore, it is an object of the invention to provide a securing device of the type described in the introduction which effectively prevents the excitation of a turbocharger to natural frequency oscillations via the base.

This object is achieved by a securing device having the features of patent claim 1.

The securing device according to the invention comprises a first foot and a second foot, which can be secured to the base and are connected to the turbocharger at an axial distance from one another in the usual way. According to the invention, the second foot has a casing connection region, which can be connected to the turbocharger casing and is designed in the form of at least a partial circle arc. Furthermore, the second foot has a base connection region, which is at an axial distance from the casing connection region, can be connected to the base and is connected to the casing connection region by means of an axial strut arrangement. The axial strut arrangement includes an angle $\alpha$ in the range from 0° to 60° with the base. This specific configuration of the second foot greatly increases the rigidity of the latter and thereby shifts the natural frequency of a turbocharger secured to a base using this securing device toward higher frequencies. The natural frequency of a turbocharger secured in this way is then outside the frequency range of the ignition frequencies which typically occur in engines, and consequently it is possible to effectively prevent excitation to natural frequency oscillations by engines.

The second foot can be connected to the turbocharger casing in a particularly simple way if the turbocharger casing has a connecting flange which has substantially the same radius as the circle arc or partial circle arc of the casing connection region, so that the connecting flange and the casing connection region engage in one another in a positively locking manner. For this purpose, the casing connection region advantageously has a stop in the form of a circle arc. The casing connection region and the turbocharger casing are finally fixed with respect to one another by means of fixing elements which are distributed uniformly over the partial circle arc or circle arc and which may, for example, be bolts.

In a particularly preferred embodiment, since it is highly rigid, the casing connection region describes a partial circle arc of 180°±30°. A full circle arc is also conceivable and likewise results in good rigidity values for the second foot, but this may unnecessarily restrict the accessibility of the turbocharger casing. It is particularly advantageous if the base connection region is arranged on the opposite side of the casing connection region from the first foot. For the securing device, this results in a larger standing surface, and is also a simpler installation option.

If the second foot has side strut arrangements, which engage tangentially on the circle-arc-shaped casing connection region on both sides of the longitudinal axis of the turbocharger and extend as far as the base, forming a support, the rigidity of the foot is increased. Especially good results are achieved if the side strut arrangements extend not only from the casing, connection region to the base but also connect the casing connection region to the base connection region. The most simple way of achieving this is with side strut arrangements designed in plate form. To save weight and material, it is possible for the plates to have apertures or for the side strut arrangements to be designed in the form of struts or grids.

If the axial strut arrangement is in each case laterally connected to the respective side strut arrangement over its entire axial length, the rigidity is increased further and the natural frequency of the turbocharger secured using the securing device is shifted toward even higher frequencies.

In a particularly preferred embodiment, since it is highly rigid, the axial strut arrangement is designed in the form of a shell-like strut plate. The cross section of this strut plate, in the casing connection region, reproduces the partial circle arc or circle arc of the casing connection region and, in the region of the base connection region, preferably describes approximately a straight line. Like the side strut arrangement, this strut plate may also have apertures in order to save material, but in this case it is also conceivable for the axial strut arrangements to be designed in the form of struts or grids.

If the second foot is connected to the base with the aid of securing means in such a manner that the second foot can be displaced with respect to the base at least axially in the region of a defined path, the foot, despite being highly rigid, can effectively absorb thermally induced dilation of the turbocharger casing. By contrast, the first foot is fixed in position on the base, with the result that the first foot, as it were, defines the 0 point of the turbocharger position with respect to the base.

A connection to the base which has a displacement path, as provided for the second foot, can be realized most easily if receiving openings, which are designed to receive a securing means with play, are provided in the base connection region, the securing means comprising a securing element which can be fixed in the base and a sliding shoe which surrounds the securing element. Examples of the design of securing means of this type with securing element and sliding shoe are disclosed in EP application No. 00810663.5, FIG. 2a to 6b, which was filed on Jul. 26, 2000, and the associated description. This disclosure is hereby incorporated.

In the case of a turbocharger having a turbocharger casing which, along its longitudinal axis, comprises a compressor casing and a turbine casing with a gas outlet casing and a gas inlet casing, it is particularly advantageous for the securing device according to the invention to be fitted in such a manner that the second foot is arranged at a distance from the first foot in the direction of the turbine casing. For installation and dismantling, the simplest solution is for the second foot to be connected to the gas outlet casing on the turbine side. In this case, the first foot is advantageously connected to the gas outlet casing on the compressor side.

In a particularly preferred embodiment, the first foot, for connection to the gas outlet casing, has a connecting element which can be connected to the gas outlet casing approximately axially in the center of the latter and axially fixes the gas outlet casing. It is advantageous for the connecting element to be connected on the compressor side to a receiving saddle, on which the compressor side of the gas outlet casing is mounted in a displaceable manner and supported with respect to the base. In this way, the first foot supports the turbocharger not just at one location, but rather at two discrete locations, and is at the same time able to absorb thermally induced casing dilation of the turbocharger without stresses occurring in the material.

However, it is also possible for the first foot to be designed as a conventional bearing foot, as shown, for example, in H420-42TU11 E1-A-0, (1,0) 98-3 R, p. 6 and in DE-A1-199 25 684.

Further preferred embodiments form the subject matter of further dependent claims.

BRIEF DESCRIPTION OF THE DRAWINGS

In the text which follows, the subject matter of the invention is explained in more detail on the basis of preferred exemplary embodiments, which are illustrated in the appended drawings, in which, purely diagrammatically.

Figure 1:
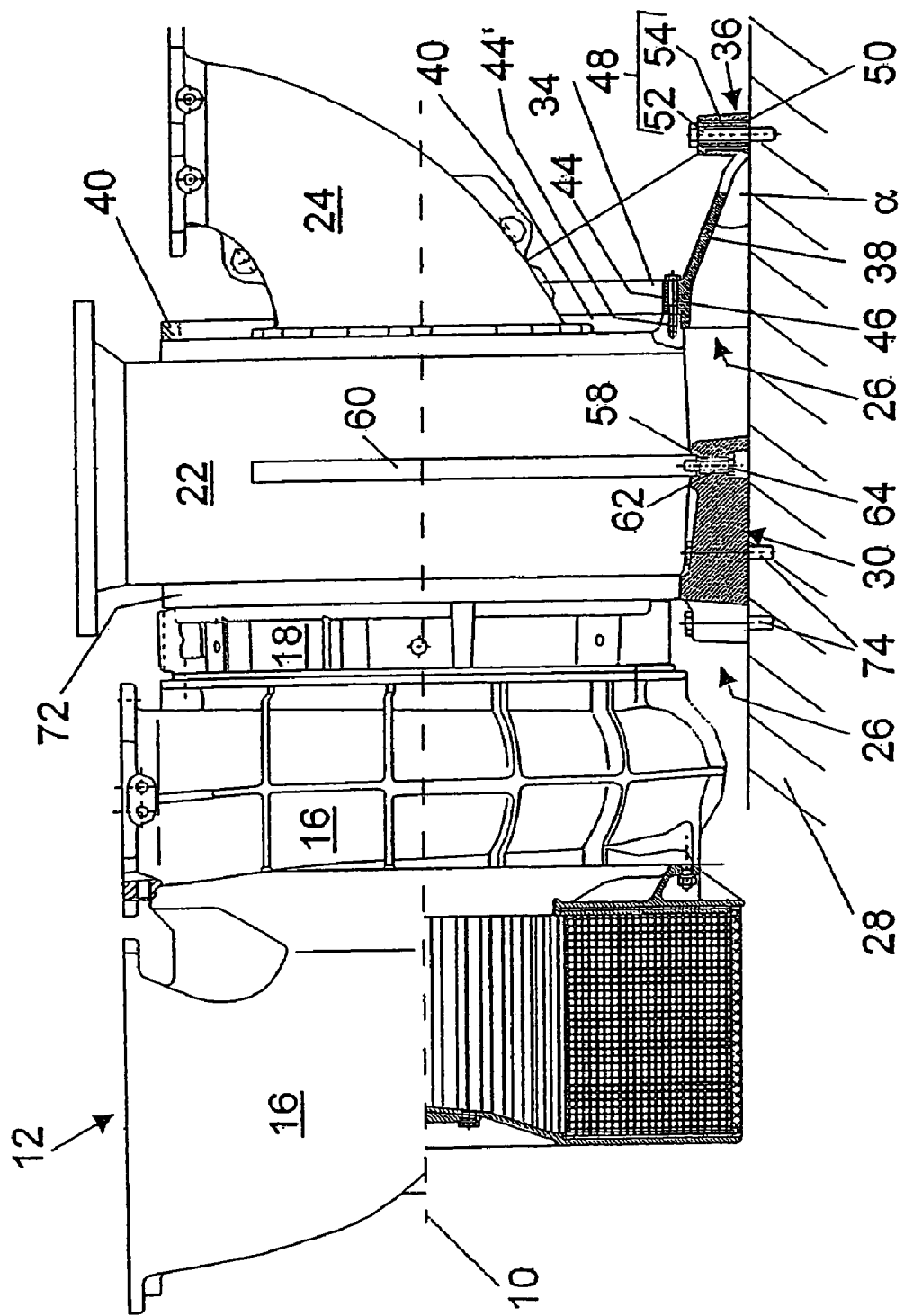
FIG. 1 shows a side view of a turbocharger along its longitudinal axis with securing device according to the invention, the securing device being illustrated in section.

The reference numerals used in the drawings and their meaning are summarized in the list of reference symbols. In principle, identical parts are provided with identical reference symbols in the figures. The embodiment described represents an example of the subject matter of the invention and does not imply any restriction whatsoever.

WAYS OF CARRYING OUT THE INVENTION

FIG. 1 shows a side view, along its longitudinal axis 10, of a turbocharger 12 with a turbocharger casing 14 which, along the longitudinal axis 10, comprises a compressor casing 16, a bearing casing 18 and a turbine casing 20. The turbine casing 20, for its part, includes a gas outlet casing 22 and a gas inlet casing 24. The turbocharger 12 is secured to a base 28 by means of a securing device 26 according to the invention. The securing device 26 has a first foot 30, which can be fixed in the base, and a second foot 32, which can be fixed in the base at an axial distance therefrom. The feet are in each case connected to the turbocharger casing 14, specifically in each case at the gas outlet casing 22, with the first foot 30 being arranged on the gas outlet casing 22 on the compressor side and the second foot 32 being arranged on the gas outlet casing 22 on the turbine side.

Figure 2:
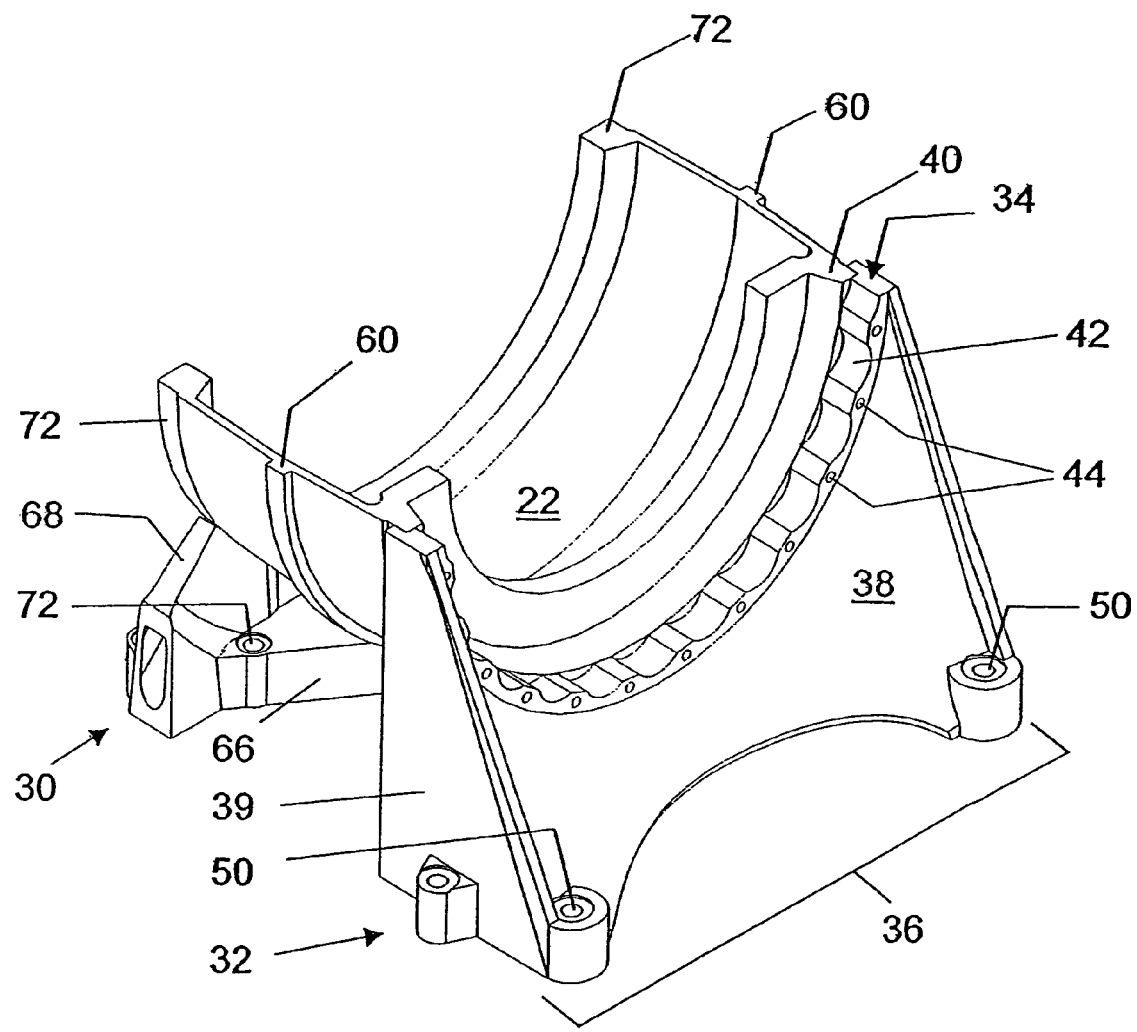
FIG. 2 shows a perspective and enlarged view of the securing device according to the invention in a horizontal section through the gas outlet casing of the turbocharger from FIG. 1.
Figure 3:
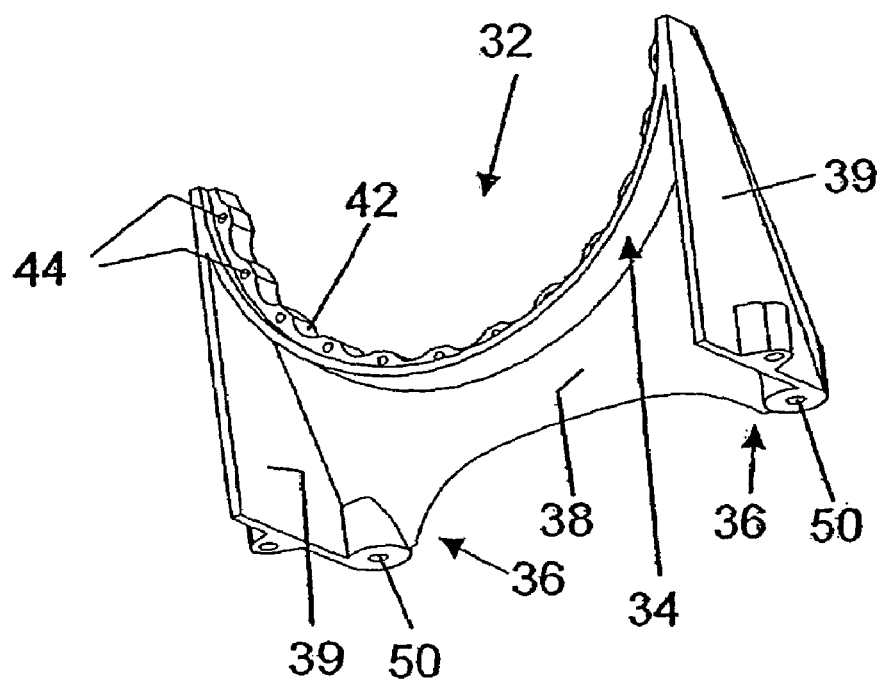
FIG. 3 shows a perspective view, obliquely from below, of one of the two feet belonging to the securing device from FIG. 1.

As can be seen from FIGS. 1, 2 and 3, the second foot 32, for connection to the turbocharger casing 14, has a casing connection region 34, which in this example is designed as a partial circle arc with an arc length of 180°. As an alternative to a partial circle arc, however, it is also conceivable to use a full circle arc, but in this case accessibility of the turbocharger 12 may under certain circumstances be excessively restricted by such a configuration. To achieve a good rigidity, a partial circle arc of 180°±30° is ideal, but if the demands imposed are relatively low sufficient rigidity may even be achieved with a partial circle arc of approximately 90°. A base connection region 36, which can be connected to the base 28, is arranged at an axial distance from the casing connection region 34. In the example shown, the base connection region 36 has an extent, transversely with respect to the longitudinal axis 10 of the turbocharger 14, which corresponds to approximately double the radius of the partial circle arc or circle arc of the casing connection region 34. However, these dimensions may also be slightly larger or smaller, depending on the space available and the rigidity requirements.

An axial strut arrangement 38 connects the two connection regions 34, 36 to one another and includes an angle α which in this example is in the range from approximately 25° to 30° with the base 28. To achieve a good rigidity, this angle α may be between 0° and 60°, i.e. an axial strut arrangement 38 running parallel to the base 28 is also conceivable and satisfies the demands imposed. For this purpose, however, the base connection region 36 has to be designed in such a manner that the axial strut arrangement 38 can engage on the base connection region 36 at approximately the same distance from the base 28 as it engages on the turbocharger casing 14 by means of the casing connection region 34. In the example shown, the axial strut arrangement 38 is designed as a strut plate. However, it may also be realized in the form of individual struts or in the form of a grid.

The casing connection region 34 and the base connection region 36, in the case of the second foot 32 shown, are additionally connected laterally to in each case one side strut arrangement 39. This side strut arrangement 39 engages tangentially on the circle-arc-shaped casing connection region 34 and extends as far as the base 28. In the example shown, the side strut arrangement 39 is configured in the form of an approximately triangular plate. However, it may also, like the axial strut arrangement 38, be designed in the form of individual struts or in the form of a grid.

As illustrated in FIGS. 1 and 2, the gas outlet casing 22, on its turbine-side end wall, has a connecting flange 40, which has the same radius as the casing connection region 34 of the second foot 32. In the example shown, the connecting flange 40 describes a full circle. This is particularly expedient since it allows the second foot 32 to be secured to the connecting flange in any desired position with respect to the casing. For this purpose, in its casing connection region 34 the second foot 32 has a stop 42, so that the connecting flange 40 and the stop 42 of the casing connection region 34 engage in one another in a positively locking manner in order to connect the second foot 32 to the turbocharger casing 14. Openings 44, which correspond to further openings 44' in the connecting flange 40 and receive fixing elements 46, are distributed uniformly over the partial circle arc or circle arc of the casing connection region 34. The two parts are fixed with respect to one another with the aid of the fixing elements 46, in this case bolts. In the example shown, the openings 44, 44' are arranged in the stop 42 of the casing connection region 34 and in the connecting flange 40, which has the advantage that there is a greater thickness of material in the region of the openings 44, 44'. However, the openings 44, 44' may also be arranged directly in the casing connection region 34 or in the turbocharger casing 14. Also, the connecting flange 40 may be arranged not on the end side of the gas outlet casing 22, but rather on its periphery, and the stop 42 may be of corresponding different configuration or omitted altogether.

If the casing connection region 34 is configured as a closed circle-arc flange, it is conceivable for this flange to be clamped between gas outlet casing 22 and gas inlet casing 24 (not shown), and for the second foot 32 to be connected to the turbocharger casing 14 in this way.

To enable the second foot to absorb thermal dilation of the turbocharger casing 14, in the example shown here it is connected to the base 28 with the aid of securing means 48, in such a manner that it can be displaced with respect to the base 28 in the region of a defined path. For this purpose, the base connection region 36 has receiving openings 50 for receiving in each case one securing means 48. Each securing means 48 comprises a securing element 52 and a sliding shoe 54 which surrounds the securing element. The securing element 52 fixes the sliding shoe 54 to the base 28. On its opposite side from the base 28, the sliding shoe has arms which project over the edges of the receiving opening 50, and it is received with play in the receiving opening 50. This design, which is described in detail in the EP application No. 00810663.5 filed on Jul. 26, 2000, FIG. 2a to 6b and the associated description, enables the second foot 32 to be displaced with respect to the base 28 in the region of the path defined by the play yet nevertheless to be sufficiently securely connected to the base.

Figure 4:
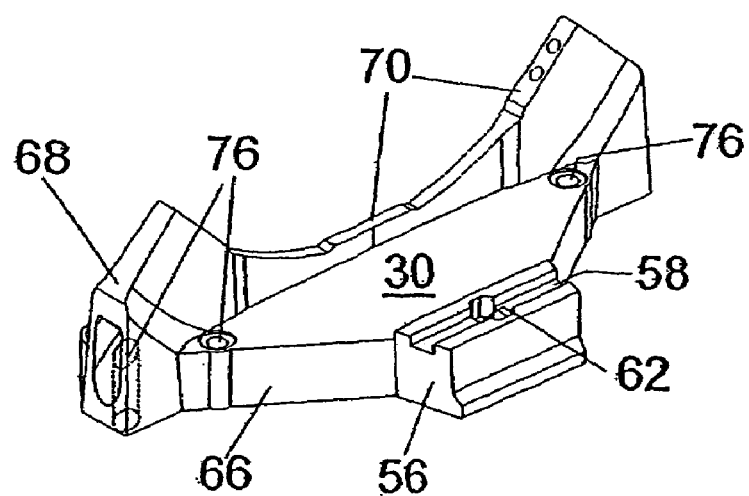
FIG. 4 shows a perspective view, obliquely from above, of the other foot of the securing device from FIG. 1.

The first foot 30 is illustrated in detail in FIG. 4. It has a connecting element 56 with a groove 58, which interacts with a fixing strip 60 arranged on the gas outlet casing 22 in order to axially fix the turbocharger 12 (cf. FIGS. 1 and 2). In addition, a hole 62, which corresponds to a corresponding hole 62' in the gas outlet casing 22, is arranged in the connecting element 56. The two holes 62, 62' are intended to receive a securing body 64. The connecting element 56 is connected to a receiving saddle 68 by means of a connecting body 66. The receiving saddle 68 has bearing surfaces 70, on which the compressor side of the gas outlet casing 22 is mounted in a sliding fashion. In the example shown in FIGS. 1 and 2, the gas outlet casing 22 has an additional bearing flange 72 designed for this purpose. The first foot 30 is secured in a fixed position to the base 28 by fixing means 74, which are guided through corresponding openings 76. To enable the first foot 30 also to be secured in any desired position to the turbocharger casing 14, the bearing flange and the fixing strip are also if possible designed to describe a 360° arc. It will be understood that this embodiment of the first foot 30, which is described in detail, has no restricting effect, and similar designs are also possible. As an alternative to the groove 58 and the fixing strip 60, for example, it is also possible for recesses or holes with a circular cross section or a polygonal cross section to interact with pins arranged on the circumference of the gas outlet casing 22 of mating design. The holes 62, 62' and the fixing means 74 may also be configured differently or even omitted altogether.

Figure 5:
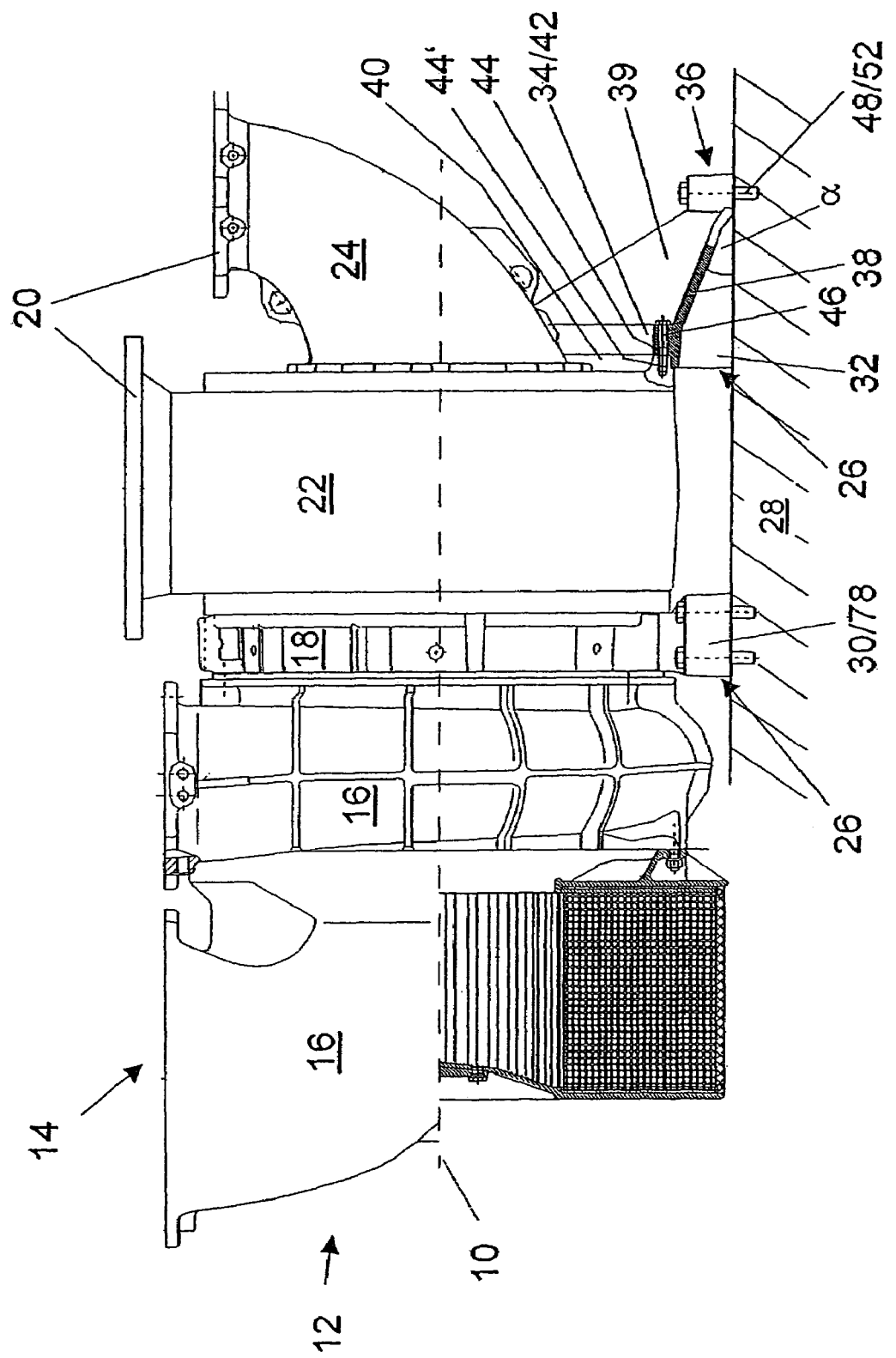
FIG. 5, in an illustration similar to that shown in FIG. 1, shows a second embodiment of the securing device according to the invention.

The first foot 30' may also be arranged on the bearing casing 18 rather than on the gas outlet casing 22, as illustrated in FIG. 5. With the exception of the first foot 30, FIG. 5 corresponds to the securing device 26 illustrated in FIG. 1. A first foot 30', which is designed as a bearing foot 78 in the form shown, may then be configured in a known way, as represented, for example, in brochure H420-42TU11 E1-A-0, (1,0) 98-3 R, p. 6, from Mitsubishi Heavy Industries, Ltd., and in DE-A1-199 25 684.

LIST OF REFERENCE SYMBOLS

10 Longitudinal axis
12 Turbocharger
14 Turbocharger casing
16 Compressor casing
18 Bearing casing
20 Turbine casing
22 Gas outlet casing
24 Gas inlet casing
26 Securing device
28 Base
30 First foot
32 Second foot
34 Casing connection region
36 Base connection region
38 Axial strut arrangement
40 Connecting flange
42 Stop
44, 44' Openings
46 Fixing elements
48 Securing means
50 Receiving openings
52 Securing element
54 Sliding shoe
56 Connecting element
58 Groove
60 Fixing strip
62, 62' Hole
64 Securing body 66 Connecting body
68 Receiving saddle
70 Bearing surface
72 Bearing flange
74 Fixing means
76 Opening
78 Bearing foot

The invention claimed is:

1. A securing device for securing a turbocharger casing of a turbocharger to a base, the securing device comprising:
   a first and a second foot which can be fixed to the base, the two feet being configured so as to connect to the turbocharger casing at an axial distance from one another;
   the second foot comprising a casing connection region, which is configured to connect to the turbocharger casing and is in the form of at least a partial circle arc, a base connection region, which is at an axial distance from the casing connection region and is configured to connect to the base, and an axial strut arrangement, which connects the two connection regions to one another and includes an angle α in the range from 0° to 60° with respect to the base;
   wherein the casing connection region comprises an axial stop which conforms to and extends along the shape of the circle arc and is configured to connect in a positively locking manner in the axial direction to the turbocharger casing, and the axial stop protrudes radially inward toward the center of the circle arc and forms an abutment surface that faces substantially in the axial direction.

2. The securing device as claimed in claim 1, wherein the casing connection region describes an arc of at least 90°, wherein the base connection region is arranged in particular on the opposite side of the casing connection region from the first foot.

3. The securing device as claimed in claim 1, wherein the turbocharger casing has a connecting flange, the external radius of which corresponds to the radius of the partial circle or circle arc of the casing connection region, so that the connecting flange and the casing connection region engage in one another in a positively locking manner, and wherein the casing connection region and the turbocharger casing are fixed with respect to one another by means of fixing elements which are distributed uniformly over the partial circle arc or circle arc.

4. The securing device as claimed in claim 1, wherein the second foot has side strut arrangements, which engage on the circle-arc-shaped casing connection region on both sides of the longitudinal axis of the turbocharger and extend as far as the base, forming a support.

5. The securing device as claimed in claim 4, wherein the side strut arrangements connect the casing connection region to the base connection region and are plate-shaped.

6. The securing device as claimed in claim 4, wherein the axial strut arrangement is designed in such a way that it is in each case laterally connected to the respective side strut arrangement over its entire axial length.

7. The securing device as claimed in claim 1, wherein the axial strut arrangement is designed in the form of a shell-shaped strut plate, the cross section of which in the casing connection region reproduces the partial circle arc or circle arc of the casing connection region, and its cross section in the region of the base connection region describes approximately a straight line.

8. The securing device as claimed in claim 1, wherein the second foot is connected to the base with the aid of securing means in such a manner that the second foot can be displaced with respect to the base at least axially in the region of a defined path.

9. The securing device as claimed in claim 8, wherein the base connection region has receiving openings for the receiving, with play, of a securing means, the securing means comprising a securing element which can be fixed in the base and a sliding shoe which surrounds the securing element.

10. The securing device as claimed in claim 1, wherein the turbocharger casing, along its longitudinal axis, comprises a compressor casing and a turbine casing with a gas inlet casing and a gas outlet casing, and to secure the turbocharger the second foot is arranged at a distance from the first foot, in the direction of the gas inlet casing, and in particular is connected to the gas outlet casing on the turbine side.

11. The securing device as claimed in claim 10, wherein the first foot is connected to the gas outlet casing on the compressor side.

12. The securing device as claimed in claim 11, wherein the first foot has a connecting element which is connected to the gas outlet casing and axially fixes the gas outlet casing, the connecting element being connected on the compressor side to a receiving saddle, on which a compressor side of the gas outlet casing is supported in a sliding manner.

13. The securing device as claimed in claim 10, wherein the first foot is designed as a bearing foot which is connected to a bearing casing arranged between the turbine casing and the compressor casing.

14. The securing device as claimed in claim 1, wherein the casing connection region describes an arc of 180°±30°, wherein the base connection region is arranged in particular on the opposite side of the casing connection region from the first foot.

15. A turbo charger apparatus comprising:
   a turbocharger;
   a base;
   a first and a second foot which can be fixed to the base, the two feet being configured so as to connect to the turbocharger casing at an axial distance from one another;
   the second foot comprising a casing connection region, which is configured to connect to the turbocharger casing and is in the form of at least a partial circle arc, a base connection region, which is at an axial distance from the casing connection region and is configured to connect to the base, and an axial strut arrangement, which connects the two connection regions to one another and includes an angle α in the range from 0° to 60° with respect to the base;
   wherein the casing connection region comprises an axial stop which conforms to and extends along the shape of the circle arc and is configured to connect in a positively locking manner in the axial direction to the turbocharger casing, and the axial stop protrudes radially inward toward the center of the circle arc and forms an abutment surface that faces substantially in the axial direction.

* * * * *